H. M. LAMBERT.
SPRING TIRE.
APPLICATION FILED MAY 20, 1912. RENEWED JULY 15, 1915.

1,171,214.

Patented Feb. 8, 1916
2 SHEETS—SHEET 1.

WITNESSES

INVENTOR
Henry M. Lambert
BY
ATTORNEYS

H. M. LAMBERT.
SPRING TIRE.
APPLICATION FILED MAY 20, 1912. RENEWED JULY 15, 1915.
1,171,214. Patented Feb. 8, 1916.
2 SHEETS—SHEET 2.
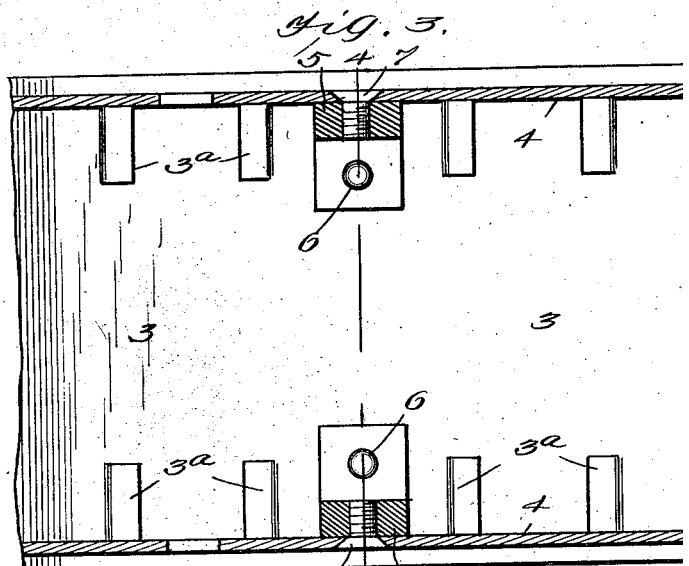
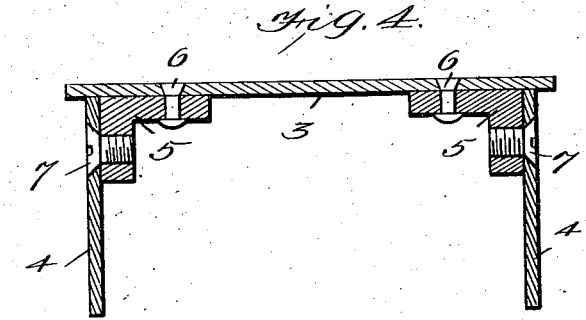
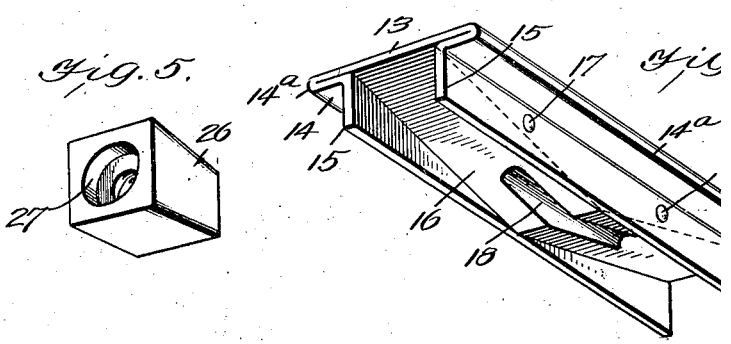
INVENTOR
Lambert
WITNESSES
ATTORNEYS

UNITED STATES PATENT OFFICE.

HENRY MILLER LAMBERT, OF PORTLAND, OREGON, ASSIGNOR TO LAMBERT MULTI-PLUS COMPANY, OF PORTLAND, OREGON, A CORPORATION OF ARIZONA.

SPRING-TIRE.

1,171,214. Specification of Letters Patent. Patented Feb. 8, 1916.

Application filed May 20, 1912, Serial No. 698,494. Renewed July 15, 1915. Serial No. 40,124.

*To all whom it may concern:*

Be it known that I, HENRY MILLER LAMBERT, a citizen of the United States, and a resident of Portland, in the county of Multnomah and State of Oregon, have invented a new Improvement in Spring-Tires, of which the following is a full, clear, and exact description.

My invention is an improvement in spring tires, and has for its object to provide a tire of the character specified, which while having a large amount of resiliency will not be injured by puncture, and wherein means is provided for permitting the resiliency of the tire to be varied.

Figure 1:
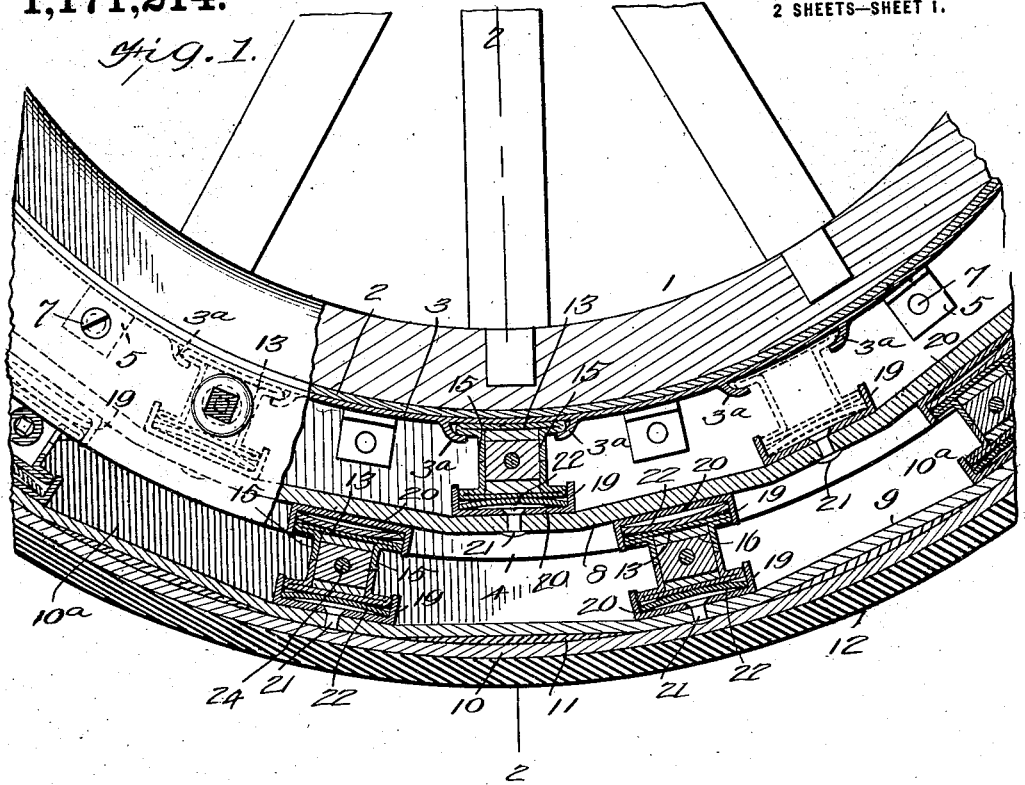
Figure 2:
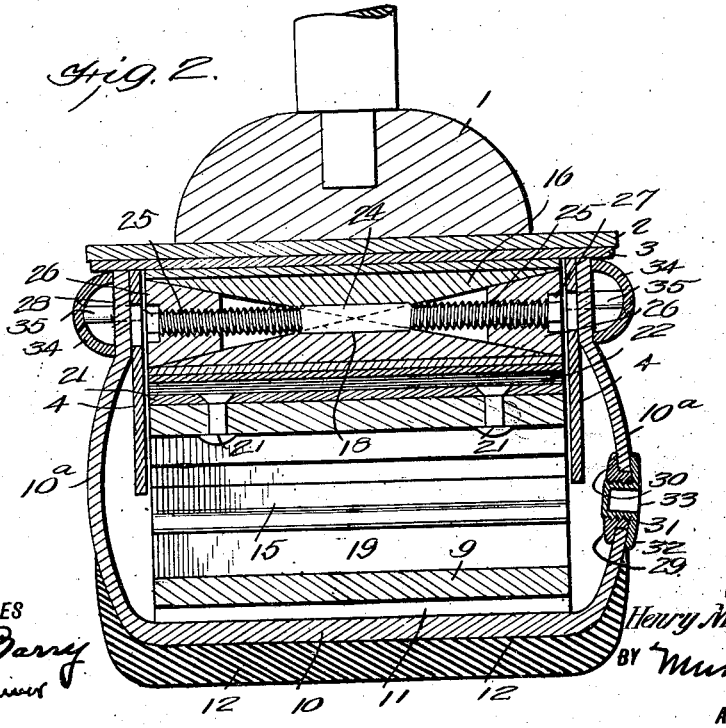

In the drawings: Figure 1 is a partial longitudinal section of a tire constructed in accordance with the invention. Fig. 2 is a section on the line 2—2 Fig. 1. Fig. 3 is a section on the line 3—3 of Fig. 2. Fig. 4 is a section on the line 4—4 of Fig. 3. Fig. 5 is a perspective view of one of the nuts, and, Fig. 6 is a perspective view of one of the sections of the sectional casing.

In the present embodiment of the invention, the felly 1 of the wheel is of usual construction, and has seated on the outer face thereof, a metallic felly band 2, and a rim band 3 is seated on the felly band 2. The rim band 3 is provided with a plurality of pairs of transverse guideways, each guideway consisting of an overlying flange 3ª, said flanges being transverse to the rim band 3 and the felly.

The felly band 2 is of steel, and is secured rigidly to the wooden fellies forming the felly 1. The rim band 3 is also of steel, fitting snugly over the band 2, but arranged to be slipped off or on as desired. A steel rim ring or flange 4 is arranged at each side of the rim band 3, and each rim ring is secured to the rim band, by means of angle lugs 5. Each angle lug consists of two portions at right angles to each other and one of the said portions is riveted to the rim band 3 by means of rivets 6, while the other angle portion is secured to the adjacent rim plate by means of a screw 7. Each screw 7 is passed through the outer side of the rim ring, and the rim ring is countersunk as shown in Fig. 4 to receive the head of the screw.

A belt 8 is arranged concentric with the felly in radially spaced relation, and a second belt 9 is arranged concentric with the wheel, outside of the belt 8, and in radially spaced relation. A casing 10 of suitable material is arranged outside the belt 9, and a plurality of fillers 11 are arranged between the belt 9 and the casing 10. Each of the said fillers is of greatest thickness at its center and decreases in thickness toward its end. And the said fillers are arranged in a particular position with respect to the wheel, as will appear later.

A rubber tread 12 is vulcanized onto the casing 10, and the said casing 10 is provided at each side edge with a lateral flange 10ª, which extends inwardly toward the felly, and is connected to the rim rings or flanges 4 in a manner to be presently described.

A series of sectional casings is arranged between the rim band 3 and the belt 8, and a similar series is arranged between the belts 8 and 9. Each of the sections of the said casings (Figs. 1, 2 and 6) is composed of a sheet of metal 13 having its side edges bent inwardly upon the sheet, as shown at 14, and thence laterally from the sheet to form spaced parallel flanges 15. A filling block 16 is arranged between the flanges 15, and is secured thereto by rivets 17. Each of the said blocks is of greatest depth at its center and is inclined toward each of its ends, as is shown in Fig. 6. That is each of the said blocks is an isosceles triangle, the base resting on the sheet 13, the apex being flush with the free edges of the flanges 15 at the center thereof. Each of the said blocks is provided with a longitudinal groove 18, at its apex for a purpose to be presently described.

The sections are arranged with the free edges of the flanges 15 in contact, and one section of each casing of the series between the rim band 3 and the belt 8 is held by the guideways 3ª before mentioned. The doubled-over portion of the sheet forming each section of the casing provides a laterally extending flange 14ª for engaging beneath the overlying flange or guideway 3ª, and the casing sections are held in place in this manner.

Each of the outer sections of the casings of the series between rim band 3 and belt 8, and both sections of the series of casings arranged between belts 8 and 9 is supported by a channel plate comprising a body 20 and side edges or flanges 19. Each of the said sections is seated between the flanges 19 of the channel plate, and an arc-shaped plate spring 22 is arranged between the body 20 of each channel plate and the body 13 of the casing section. Said spring normally holds the casing section spaced apart from the body of the channel plate. The channel plates of the innermost series adjacent to the belt 8, and the channel plates of the outermost series adjacent to the belt 9, are secured to the said plate by means of rivets 21. The casings just described are arranged in spaced relation, and the outermost series of casings, that is that series between belts 8 and 9, is arranged in staggered relation with respect to the innermost series, that is the series between rim band 3 and belt 8. The filling plates 11, before mentioned, are arranged between each pair of casings of the outermost series, and the free edges of the said plates extend adjacent to the sides 19 of the channel plates.

A bolt 24 is arranged in the grooves 18 of the sections of each casing, and the ends of the said bolt are threaded in opposite directions, as shown at 25 in Fig. 2. A nut 26 is arranged in each end of each casing, and each of the said nuts is provided with a longitudinal threaded opening for engagement by the adjacent threaded end of the rod 24. Each of the said nuts is rectangular in cross section, and each nut engages with opposite faces the inclined faces of the block 16 of the sections of the casing. The said faces of the nut are also inclined, that is the said faces incline toward each other toward the inner end of the nut.

Each nut is provided with a circular opening or recess 27 in its outer end, into which extends the extremity of the adjacent end of the rod 24, and each of the said extremities 28 is polygonal in cross section, to permit it to be engaged and turned by a tool. It will be evident that when the rod 24 is threaded in either direction, the nuts 26 connected therewith will be moved toward or from the center of the rod. Each of the nuts engages with its inclined faces, the inward faces of the filling blocks 16, and it will be evident that when the nuts are moved toward the center of the rod the casing sections will be forced apart.

The side flanges 10ᵃ of the casing 10 are provided with openings at the end of each of the bolts of the outer series of casings, and each of the said openings is normally closed by a sectional button. Each of the said buttons consists of an inner section 29 fitting within the opening and having a lateral flange 30. The section is provided with a central opening, and the outer section 31 is threaded into the said opening. The said outer section 31 is provided with an annular flange 32 engaging the outer face of the casing 31 at the opening, and the said outer section is also provided with an opening 33 polygonal in cross section for receiving a tool, to release the said section to permit access to the adjacent bolt 24. The button sections may be secured to the casing flange in any suitable manner. The inner edges of the flanges 10ᵃ of the casing are held to the rim rings or flanges 4, by means of rings 34, each of which is semi-circular in cross section, and of annular form. Each of the rings 34 is arranged on the inner edge of the adjacent flange, and screws 35 are passed through each ring, the inner edges of the adjacent flange, and engage the adjacent rim ring 4. Each of the rim rings 4 is provided with openings in alinement with the bolts 24 of the innermost series of casings, in order to permit access to the said bolts to turn the same. The sections of each casing coöperate to form what is in fact a split sleeve, and the nuts and the bolt 24 constitute a means for expanding or contracting the sleeves.

It will be evident that the resiliency of a wheel constructed in accordance with the improvement may be adjusted in accordance with the conditions to be met. Both series are easily accessible for the purpose of adjustment.

I claim:

1. A wheel comprising a rigid rim, a rim band on the rim, a plurality of endless flexible bands arranged concentric with the rim band and in spaced relation, a casing outside the outermost band, said casing having a lateral inwardly extending flange at each side edge and a rubber thread on the peripheral face thereof, and series of tensioning devices between the adjacent bands and between the rim band and the adjacent band, the members of each series being staggered with respect to the members of the adjacent series, each of the said tensioning devices comprising a sectional casing, a bolt journaled longitudinally of each casing and having its ends oppositely threaded, a wedge-shaped nut on each end of the bolt and having a threaded engagement with the bolt, for moving the said nuts in opposite direction when the bolt is turned, the bands and the rim band having guideways for the sections of the casing, and a transversely arched plate spring in each guideway of the flexible bands between the guideway and the adjacent casing section.

2. In a wheel having a rigid rim, a tire comprising endless flexible bands concentric with the rim, and means between the rim and the adjacent band and between the bands for varying the resiliency of the said bands, a series of the said means being arranged between the rim and the adjacent band, and a series of the said means being arranged between the bands, the members of one series being staggered with respect to the members of the other series, and each of the said means comprising a sectional casing, a bolt journaled longitudinally of each casing and having its ends oppositely threaded, a wedge-shaped nut threaded on to each end of the bolt, a fixed guideway for each section of each casing, a cushion between each guideway of the flexible bands and the adjacent casing section, each of the said casing sections being of greatest height intermediate its ends, and gradually decreasing in height toward its ends, said sections being arranged transverse to the plane of the wheel.

3. In a wheel having a rigid rim, a tire consisting of a flexible band arranged coaxially with the rim, and a series of adjusting devices between the rim and the band for varying the resiliency of the band, each of the said devices com[prising] casing arranged transvers[ely to] the wheel, each section c[onsisting] of greatest height interm[ediate,] decreasing gradually in [its] ends, a wedge-shaped nu[t on] the sections at each en[d, and] means for simultaneousl[y moving] in opposite direction, a [fixed guideway for] each section of the casin[g, and a spring be-] tween each guideway o[f the flexible bands] and the adjacent casing [sections.]

HENRY MILL[ER LAMBERT.]

Witnesses:
   E. R. ANDERSON,
   D. A. FURR.